United States Patent

Cudnohufsky et al.

[11] Patent Number: 5,832,797
[45] Date of Patent: Nov. 10, 1998

[54] ROTARY MACHINE TOOL

[75] Inventors: Sylvester R. Cudnohufsky, Troy; Gerald Cudnohufsky, Waterford, both of Mich.

[73] Assignee: Programmable Tracing Incorporated, Madison Heights, Mich.

[21] Appl. No.: 705,763

[22] Filed: Aug. 30, 1996

[51] Int. Cl.$^6$ .................................................... B23B 7/06
[52] U.S. Cl. ................................. 82/118; 82/133; 82/138
[58] Field of Search ................................. 82/118, 54, 61, 82/56, 70.1, 70.2, 71, 72, 123, 133, 134, 137, 138, 141, 154, 152, 158

[56] References Cited

U.S. PATENT DOCUMENTS

| | | | |
|---|---|---|---|
| 1,409,243 | 3/1922 | Schmidt et al. | 82/138 X |
| 3,315,550 | 4/1967 | Kykin | 82/138 X |
| 3,379,080 | 4/1968 | Massa | 82/61 |
| 3,727,493 | 4/1973 | Lahm | 82/134 X |
| 3,848,489 | 11/1974 | Santana | 82/61 |
| 4,412,465 | 11/1983 | Wright | 82/133 X |
| 4,475,421 | 10/1984 | Cudnohufsky . | |
| 4,593,586 | 6/1986 | Cudnohufsky . | |
| 5,609,081 | 3/1997 | Lin | 82/72 X |

FOREIGN PATENT DOCUMENTS

| | | | |
|---|---|---|---|
| 0197304 | 10/1985 | Japan | 82/138 |
| 001729701 | 4/1992 | U.S.S.R. | 82/138 |

*Primary Examiner*—A. L. Pitts
*Assistant Examiner*—Henry W. H. Tsai
*Attorney, Agent, or Firm*—Barnes, Kisselle, Raisch, Choate, Whitemore & Hulbert, P.C.

[57] ABSTRACT

A rotary machine tool that includes first and second slides mounted on a bed for opposed movement transverse to the axis of rotation of a workpiece. Each of the first and second slides includes facility for mounting a cutting tool for engaging diametrically opposite sides of the workpiece from directions transverse to the workpiece axis of rotation. A control mechanism is coupled to the first slide for moving the first slide relative to the bed for controlled engagement of the cutting tool on the first slide with the workpiece. A hydraulic actuator is coupled to the second slide for moving the second slide relative to the bed in a direction transverse to the workpiece axis. A synchronizing valve is operatively coupled to the first slide for operating the actuator responsive to movement of the first slide so as to move the second slide by means of the actuator in a manner equal and opposite to movement of the first slide by the controller.

13 Claims, 4 Drawing Sheets

5,832,797

ROTARY MACHINE TOOL

The present invention is directed to rotary machine tools, and more particularly to a tool having oppositely acting cutting tools in engagement with a rotating workpiece.

BACKGROUND AND SUMMARY OF THE INVENTION

It has heretofore been proposed, in U.S. Pat. No. 4,475,421 to one of the inventors herein, to provide a rotary machine tool having a pair of cutting tools that engage diametrically opposite portions of a rotating workpiece. It is a general object of the present invention to provide a rotary machine tool of this character that has improved flexibility in terms of reduced time needed for part change, that reduces the deadband between motions of the opposed cutting tools, that exhibits improved uniformity of workpiece load and reduced part chatter, and/or that embodies vertically acting cutting tools.

A rotary machine tool in accordance with the present invention includes first and second slides mounted on a bed for opposed movement transverse to the axis of rotation of a workpiece. Each of the first and second slides includes facility for mounting a cutting tool for engaging diametrically opposed sides of the workpiece from directions transverse to the workpiece axis of rotation. A control mechanism is coupled to the first slide for moving the first slide relative to the bed for controlled engagement of the cutting tool on the first slide with the workpiece. An actuator is coupled to the second slide for moving the second slide relative to the bed in a direction transverse to the workpiece axis. A synchronizing mechanism is operatively coupled to the first slide for operating the actuator responsive to movement of the first slide so as to move the second slide by the actuator in a manner equal and opposite to movement of the first slide by the controller.

In the preferred embodiment of the invention, the actuator comprises a hydraulic actuator, and the synchronizing mechanism comprises a synchronizing valve operatively coupled to the actuator and to the first slide. The synchronizing valve has a valve body with inlet and outlet ports hydraulically coupled to the actuator, a valve spool mechanism movably mounted within the valve body for controlling fluid flow between the inlet and outlet ports, and a mechanism on the valve body operatively coupled to the first slide for controlling position of the spool mechanism within the valve body as a function of movement of the first slide. The spool mechanism in the preferred embodiment of the invention comprises an outer spool mounted within the valve body and an inner spool mounted within the outer spool. The inner and outer spools have opposed lands such that fluid flow between the inlet and outlet ports of the valve body is one-half between the inner and outer spools and one-half through the inner spool. This feature of the preferred synchronizing valve construction reduces deadband between motions of the first and second slides.

The synchronizing valve is coupled to the first slide in the preferred embodiment of the invention by a mechanism for controlling position of the spool mechanism within the valve body, and thereby controlling flow of fluid to the actuator coupled to the second slide, as a function of a difference in movement between the first and second slides. Most preferably, this differential mechanism comprises a sprocket rotatably mounted on the valve, and a chain trained around the sprocket and having opposed ends coupled to the first and second slides. The sprocket is mounted on an anvil pivotally carried by the valve body, and a valve pin is slidably mounted on the valve body in engagement at opposed ends with the anvil and the spool mechanism.

In the preferred embodiments of the invention, the first and second slides comprise vertical slides, with the first vertical slide being slidably mounted on the second vertical slide, and the second vertical slide being slidably mounted on a horizontal slide. The horizontal slide is coupled to an actuator for moving the opposed vertical slides in a horizontal direction parallel to the axis of rotation of the workpiece. In alternative disclosed embodiments of the invention, the motion of the horizontal slide, and motion of the first slide with respect to the workpiece axis, are controlled either electronically by means of a CNC controller, or hydraulically by means of a tracer valve having a stylus engaged with a template.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 2:
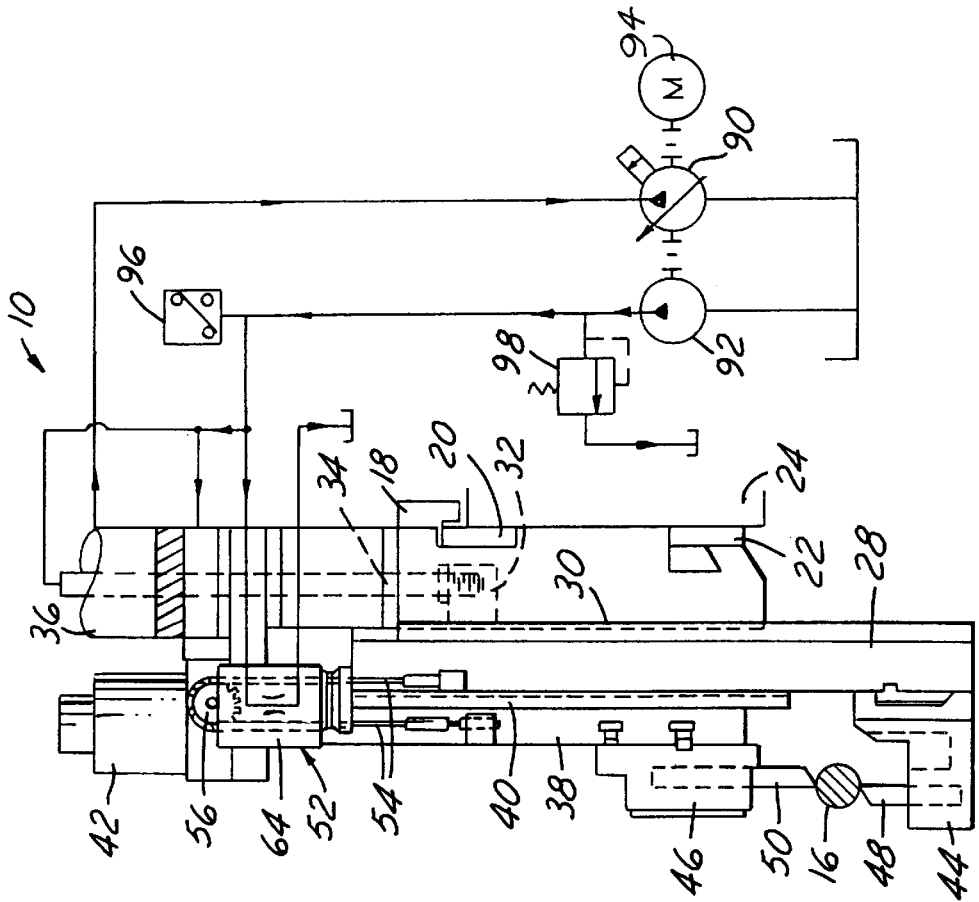
FIG. 2 is a partially schematic side elevational view of the lathe shown in FIG. 1, with portions of the hydraulic control illustrated schematically.
Figure 1:
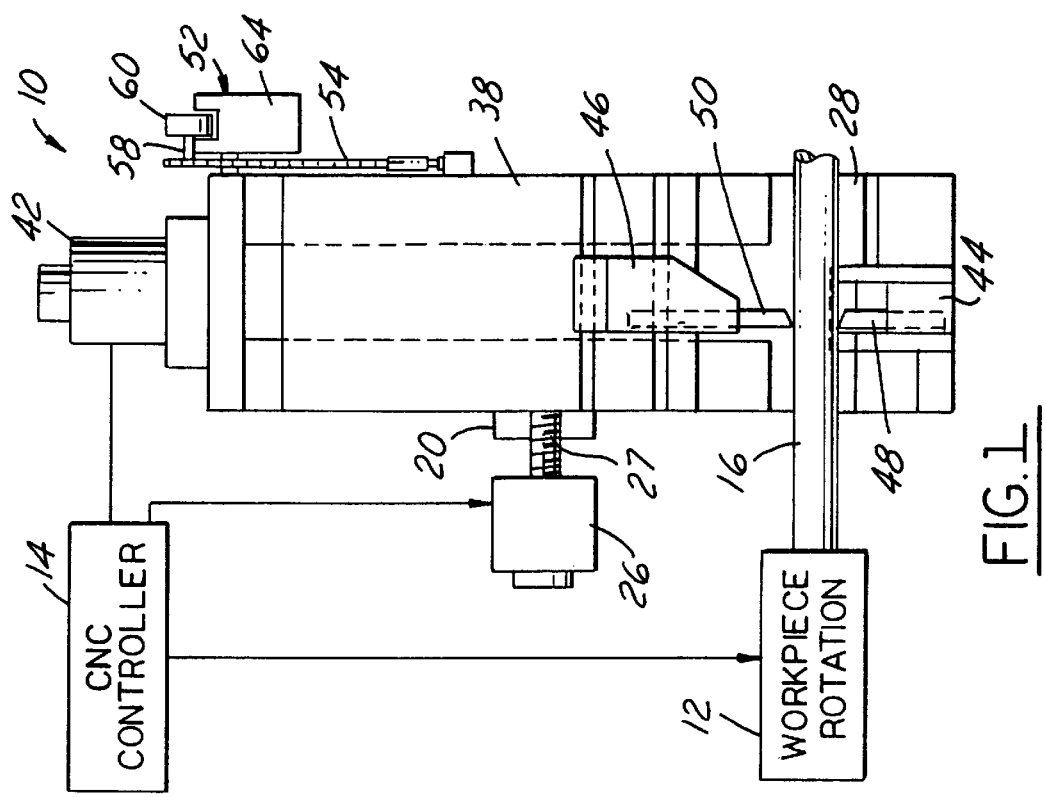
FIG. 1 is a front elevational view of a lathe in accordance with one presently preferred embodiment of the invention.
Figure 3:
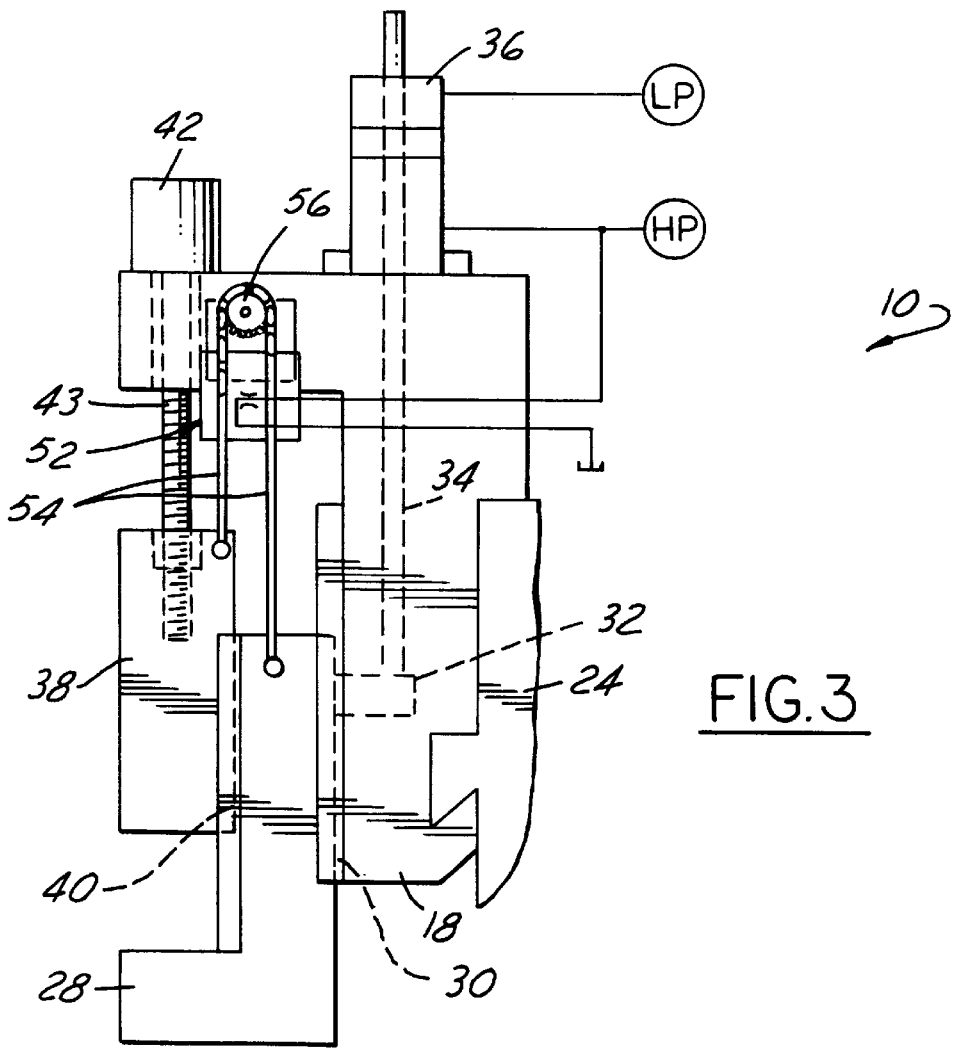
FIG. 3 is an enlarged schematic diagram of the lathe illustrated in FIGS. 1 and 2.

FIGS. 1–3 illustrate a lathe 10 in accordance with a presently preferred embodiment of the invention as comprising a chuck 12 coupled to a CNC controller 14 for rotating a workpiece 16 about a fixed axis, in this case a horizontal axis. A horizontal slide 18 is mounted by ways 20, 22 to the bed 24 of the machine. A servo motor 26 is coupled to horizontal slide 18 by a leadscrew 27, and is responsive to controller 14 for moving slide 18 in a horizontal direction parallel to the axis of rotation of workpiece 16. A vertical slide 28 is mounted on horizontal slide 18 by vertical ways 30. Vertical slide 28 has an arm 32 that is connected to the rod 34 of a hydraulic actuator 36 that is carried by horizontal slide 18. Thus, vertical motion of slide 28 with respect to slide 18 is controlled by actuator 36. A second vertical slide 38 is mounted to slide 28 by vertical ways 40. Slide 38 is coupled by a leadscrew 43 to a servo motor 42, which in turn is connected to controller 14. Thus, slide 38 is movable vertically with respect to slide 28 under control of motor 42 and controller 14. Each slide 28, 38 has an associated holder 44, 46. Each holder 44, 46 carries a cutting tool 48, 50, with the two tools 48, 50 being in diametrically opposite engagement with workpiece 16.

Figure 4:
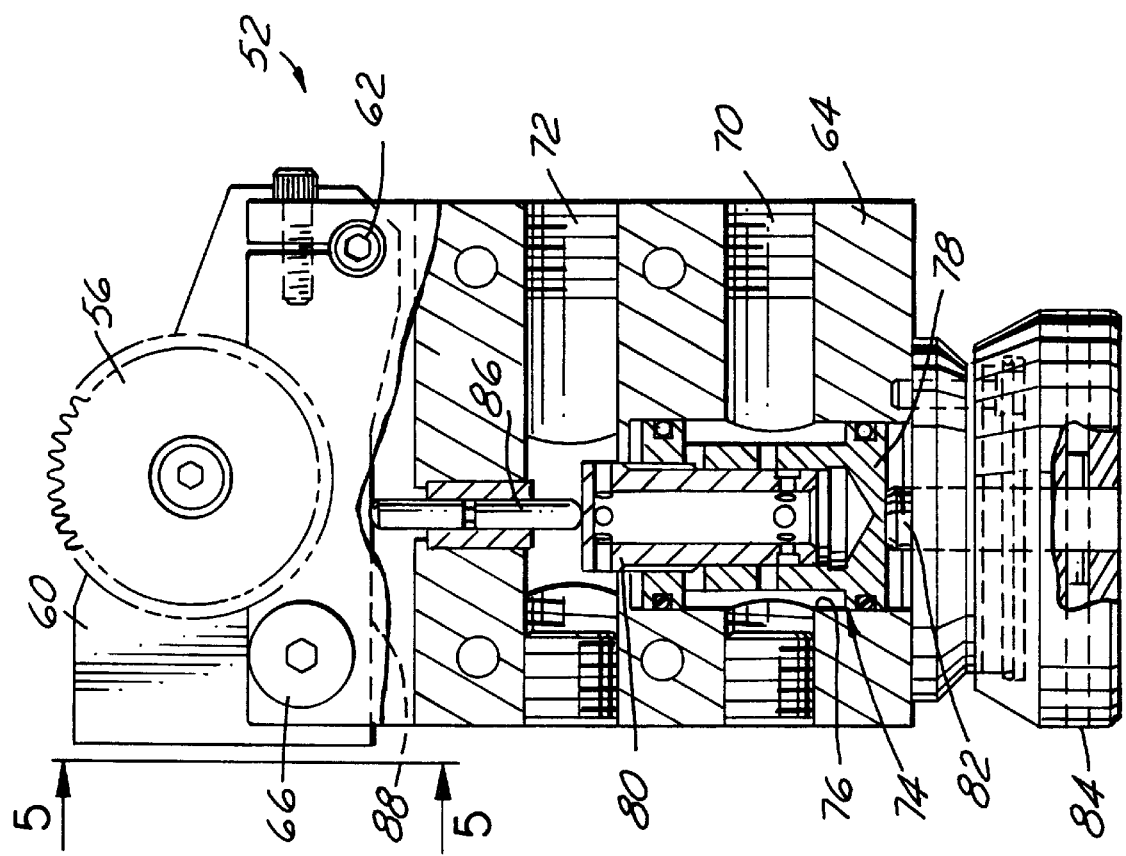
FIG. 4 is a partially sectioned elevational view of the synchronizing valve in the lathe of FIGS. 1–3.
Figure 5:
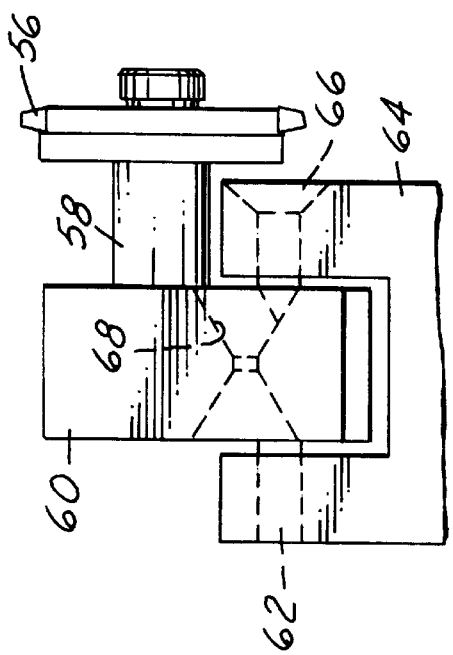
FIG. 5 is a fragmentary view of the valve illustrated in FIG. 4, being taken substantially from the direction 5—5 in FIG. 4.

A synchronizing valve 52 is carried by horizontal slide 18, and is operatively connected to vertical slides 38, 28 for synchronizing movement of the vertical slides in opposed relation to each other. A chain 54 is coupled at opposed ends to slides 38, 28, and has a central portion trained around a sprocket 56 carried by valve 52. Referring to FIGS. 4–5, which illustrate valve 52 in greater detail, sprocket 56 is rotatable on a shaft 58 carried by an anvil 60. Anvil 60 is pivotable on a shaft 62 carried by a valve body 64. A screw 66 carried by valve body 64 engages an opening 68 in anvil 60 for limiting pivotal motion of the anvil in opposed directions about the axis of shaft 62. Valve body 64 has a fluid inlet port 70 and a fluid outlet port 72. A spool assembly 74 is slidably mounted in a cross passage 76 between ports 70, 72. Spool assembly 74 includes an outer spool 78 slidable within valve body passage 76, and an inner spool 80 slidable within outer spool 78. Spools 78, 80 have diametrically opposed land areas, which are such that fluid flow between inlet port 70 and outlet port 72 is one-half between spools 78, 80 and one-half through the interior of spool 80.

A screw 82 is carried by an adjustment mechanism 84 and extends into passage 76 for opposed axial engagement with outer spool 78 so as to adjust position of outer spool 78 with respect to passage 76 and ports 70, 72. A pin 86 is slidably carried by valve body 64 axially opposed to set screw 82, and engages at opposite ends the under surface 88 of anvil 60 and the axial end of inner spool 80. Thus, position of inner spool 80 with respect to outer spool 78 is controlled by pivotal position of anvil 60 with respect to valve body 64. Pivotal position of anvil 60 with respect to valve body 64 is controlled, in turn, by the load applied to sprocket 56 by chain 54, which in turn is controlled by a position differential between vertical slides 28, 38. A pair of hydraulic pumps 90, 92 (FIG. 2) are coupled to a motor 94 for feeding fluid at high pressure to valve inlet port 70 and one side of actuator 36, and hydraulic fluid at lower pressure to the opposing side of actuator 36. A high-pressure switch 96 and a pressure relief valve 98 are also connected to the high-pressure side of pump 92.

In operation, controller 14 is preprogrammed with information relating to the desired profile to be cut into workpiece 16. Workpiece 16 is continuously rotated about a fixed axis by workpiece chuck 12 under control of controller 14, and controller 14 controls horizontal translation of horizontal slide 18 parallel to the axis of workpiece 16 by means of motor 26. Controller 14 also controls vertical translation of vertical slide 38 by means of motor 42 transverse to the axis of workpiece 16. As slide 38 is moved vertically by motor 42 so as to move holder 46 and tool 50 toward and away from the axis of workpiece 16, slide 28, holder 44 and tool 48 are moved in an equal amount but in the opposite direction by operation of valve 52 and actuator 36. For example, if slide 38 is moved downwardly so as to move tool 50 toward the axis of workpiece 16 for a deeper cut into the workpiece, downward motion of slide 38 pulls chain 54 downwardly tending to rotate sprocket 56 counterclockwise as viewed in FIGS. 2 and 4. Sprocket 56 and anvil 60 (FIG. 4) are pulled downwardly by slide 38, pivoting anvil 60 about the axis of shaft 62, pushing pin 86 downwardly against spool 80, and reducing flow of fluid from inlet port 70 to outlet port 72 toward actuator 36. Such reduced fluid flow causes actuator 36 to pull slide 28 vertically upwardly by means of rod 34 and arm 32. Valve 52 and actuator 36 are calibrated such that the vertically upward motion of slide 28 is equal and opposite to the downward motion of slide 38. Likewise, upward motion of slide 38 by motor 42 relieves downward pressure on sprocket 56 and anvil 60, allowing spool 80 to move upwardly and providing greater flow of fluid to actuator 36, whereby actuator 36 pushes slide 28 downwardly in equal amount but in opposite direction as upward motion of slide 38.

Figure 8:
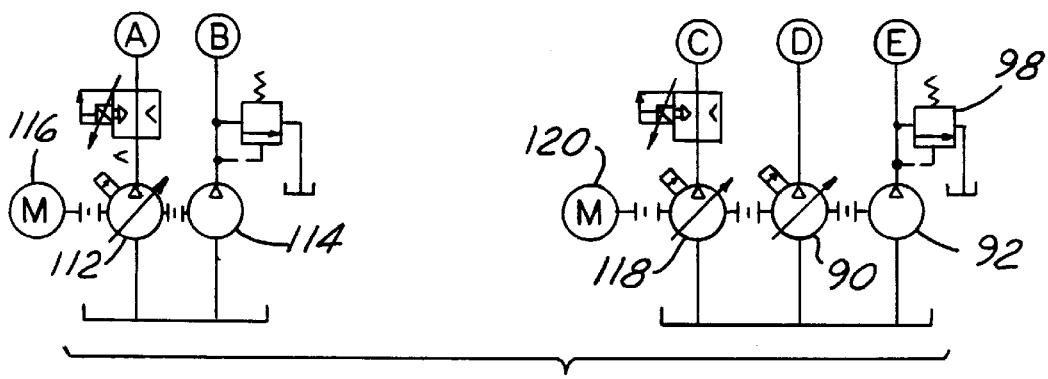
FIG. 8 is a schematic diagram of the hydraulics in the embodiment of FIGS. 6 and 7.
Figures 6, 7:
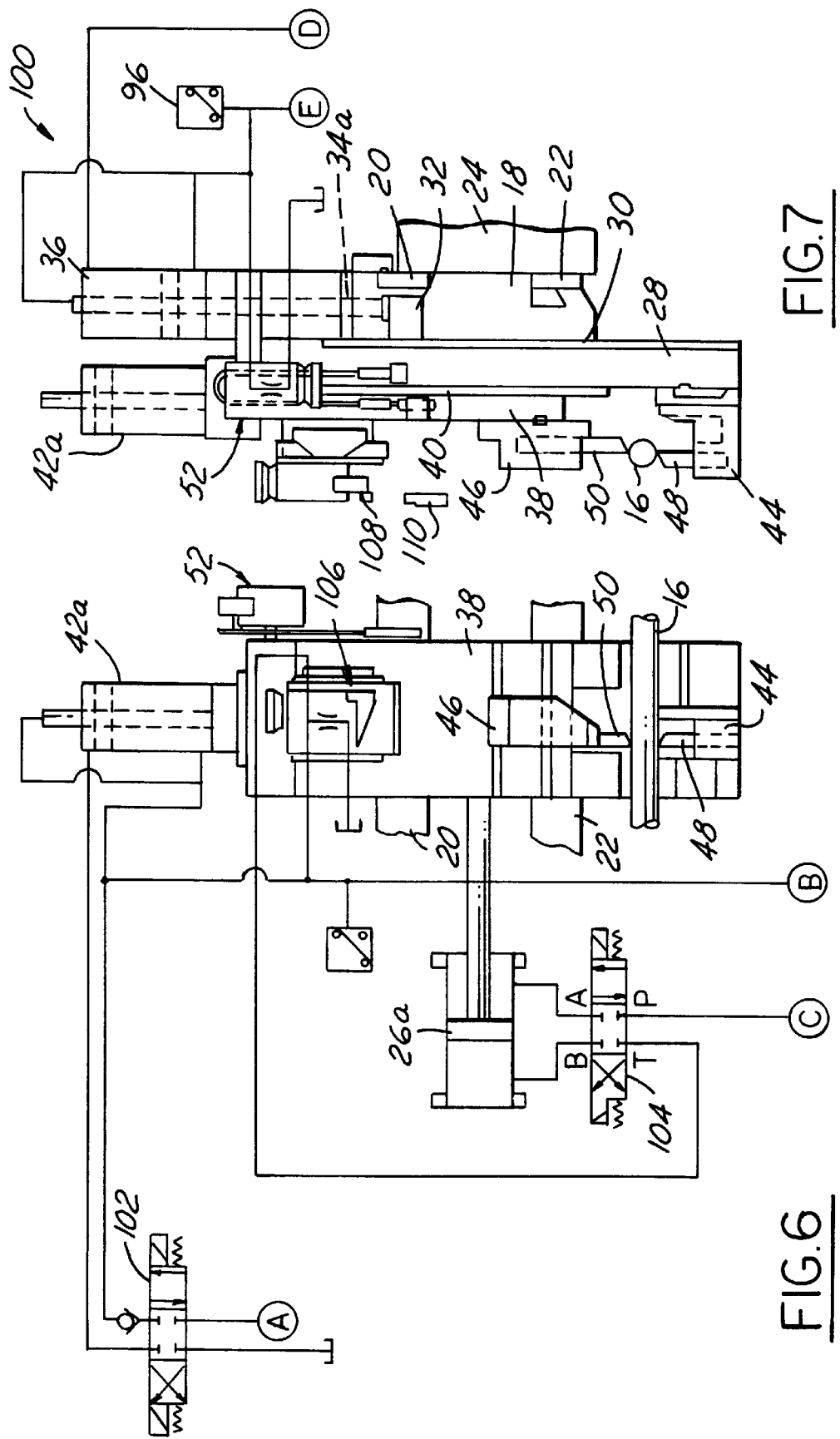
FIGS. 6 and 7 are fragmentary schematic diagrams similar to FIGS. 1 and 2 but illustrating a modified embodiment of the invention.

FIGS. 6–8 illustrate a modified embodiment 100 of the invention, in which components identical to those in the embodiment of FIGS. 1–5 are illustrated by correspondingly identical reference numerals, and components that serve a similar function to those in FIGS. 1–5 are indicated by correspondingly identical reference numerals and the suffix "a." Specifically, the embodiment 100 illustrated in FIGS. 6–8 differs from the embodiment 10 of FIGS. 1–5 primarily in the fact that embodiment 100 is entirely hydraulically operated. That is, motor 42 coupled to vertical slide 38 in the embodiment of FIGS. 1–5 is replaced in FIGS. 6–8 by a hydraulic cylinder 42a and a proportional valve 102, and motor 26 in FIGS. 1–5 coupled to horizontal slide 18 is replaced by a cylinder 26a operated by a proportional valve 104. Proportional valve 102 coupled to actuator 42a is operated by means of a tracer valve mechanism 106, which has a stylus 108 for engagement with a template 110 to control the machined contour of workpiece 16. Operation of tracer valve 106 in combination with template 110 is disclosed in greater detail in U.S. Pat. No. 4,593,586 issued to one of the inventors herein and incorporated herein by reference. Valves 102, 106 are connected to a pair of pumps 112, 114 (FIG. 8) driven by a motor 116. Horizontal translation control valve 104 is connected to a pump 118, which is driven by a motor 120 that also drives pumps 90, 92 coupled to synchronizing valve 52 and actuator 36.

There has thus been disclosed a rotary machine tool that fully achieves all of the objects and aims previously set forth. The cutting tools, the workpieces, and the control programming or template may be readily changed so as to reduce downtime during part change. Deadband between movements of the vertical slides is reduced by half by routing fluid both between the synchronizing valve spools and through the inner spool. Application of the present invention reduces machining time by one-half as compared with conventional technology, and therefore effectively doubles production. The opposed tools eliminate flexing of the workpiece under tool pressure, eliminate any requirement for a steady-rest or dampers, and eliminate tool chatter. The invention also results in an increase in part quality, and can machine most extruded workpieces in only one pass. Only two hydraulic supplies, one cylinder and one synchronizing valve are required in the hydraulic embodiment of the invention, eliminating flow controls, solenoid valves and other hardware conventionally required. The invention also achieves automatic tool compensation and adjustment.

We claim:

1. A rotary machine tool that comprises:

a tool bed, means for holding and rotating a workpiece about an axis that is fixed relative to said bed, first and second slides mounted to said bed for opposed movement transverse to said axis, each of said first and second slides including means for mounting a cutting tool for engaging diametrically opposite sides of the workpiece in directions transverse to said axis, control means for moving said first slide relative to said bed for controlled engagement of the cutting tool on said first slide with the workpiece, actuator means coupled to said second slide for moving said second slide relative to said bed transverse to said axis, synchronizing means operatively coupled to said first slide for operating said actuator means responsive to movement of said first slide so as to move said second slide by means of said actuator means in a manner equal and opposite to movement of said first slide by said control means, and a third slide mounted for movement on said bed parallel to said axis, said first and second slides being mounted on said third slide for movement transverse to said axis.

2. The tool set forth in claim 1 wherein said actuator means comprises a hydraulic actuator, and wherein said synchronizing means comprises a synchronizing valve hydraulically coupled to said actuator.

3. The tool set forth in claim 2 wherein said synchronizing valve comprises a valve body having inlet and outlet ports hydraulically coupled to said actuator, valve spool means movably mounted within said valve body for controlling fluid flow between said inlet and outlet ports, and means on said valve body operatively coupled to said first slide for controlling position of said spool means within said valve body as a function of movement of said first slide.

4. The tool set forth in claim 3 wherein said spool means comprises an outer spool mounted within said valve body and an inner spool mounted within said outer spool, said inner and outer spools having opposed lands such that fluid flow between said inlet and outlet ports flows one-half between said inner and outer spools and one-half through said inner spool.

5. The tool set forth in claim 3 wherein said means on said valve body operatively coupled to said first slide comprises means operatively coupled to said first and second slides for controlling position of said spool means within said valve body, and thereby controlling flow of fluid to said actuator, as a function of a difference in movement between said first and second slides.

6. The tool set forth in claim 5 wherein said means operatively coupled to said first and second slides comprises a sprocket rotatably mounted on said valve, a chain trained around said sprocket and having opposed ends coupled to said first and second slides, and means on said valve operatively coupling said sprocket to said spool means.

7. The tool set forth in claim 6 wherein said means on said valve operatively coupling said sprocket to said spool means comprises an anvil pivotally mounted on said valve body, said sprocket being rotatably mounted on said anvil, and a valve pin slidably mounted in said valve body and engaged at opposed ends with said anvil and said spool means.

8. The tool set forth in claim 1 wherein said first slide is mounted on said second slide and said second slide is mounted on said third slide.

9. The tool set forth in claim 1 wherein said control means comprises electronic control means including an electric motor coupled to said first slide and an electronic controller for activating said motor according to control programming prestored in said electronic controller.

10. The tool set forth in claim 1 wherein said control means comprises hydraulic control means including a hydraulic actuator coupled to said first slide and tracer control means for actuating said actuator according to movement of a tracer stylus along a template.

11. A rotary machine tool that comprises:

a tool bed, means for holding and rotating a workpiece about an axis that is fixed relative to said bed, first and second slides mounted to said bed for opposed movement transverse to said axis, each of said first and second slides including means for mounting a cutting tool for engaging diametrically opposite sides of the workpiece in directions transverse to said axis, control means for moving said first slide relative to said bed for controlled engagement of the cutting tool on said first slide with the workpiece, actuator means including a hydraulic actuator coupled to said second slide for moving said second slide relative to said bed transverse to said axis, and synchronizing means including a synchronizing valve hydraulically coupled to said actuator, and operatively coupled to said first slide for operating said actuator means responsive to movement of said first slide so as to move said second slide by means of said actuator means in a manner equal and opposite to movement of said first slide by said control means, said synchronizing valve comprising a valve body having inlet and outlet ports hydraulically coupled to said actuator, valve spool means movably mounted within said valve body for controlling fluid flow between said inlet and outlet ports, and means on said valve body operatively coupled to said first slide for controlling position of said spool means within said valve body as a function of movement of said first slide, said spool means comprising an outer spool mounted within said valve body and an inner spool mounted within said outer spool, said inner and outer spools having opposed lands such that fluid flow between said inlet and outlet ports flows one-half between said inner and outer spools and one-half through said inner spool.

12. The tool set forth in claim 4 wherein said synchronizing valve means further includes means for adjustably positioning said outer spool within said valve body.

13. A rotary machine tool that comprises:

a tool bed, means for holding and rotating a workpiece about an axis that is fixed relative to said bed, first and second slides mounted to said bed for opposed movement transverse to said axis, each of said first and second slides including means for mounting a cutting tool for engaging diametrically opposite sides of the workpiece in directions transverse to said axis, control means for moving said first slide relative to said bed for controlled engagement of the cutting tool on said first slide with the workpiece, actuator means including a hydraulic actuator coupled to said second slide for moving said second slide relative to said bed transverse to said axis, and synchronizing means including a synchronizing valve hydraulically coupled to said actuator and operatively coupled to said first slide for operating said actuator means responsive to movement of said first slide so as to move said second slide by means of said actuator means in a manner equal and opposite to movement of said first slide by said control means, said synchronizing valve comprising a valve body having inlet and outlet ports hydraulically coupled to said actuator, valve spool means movably mounted within said valve body for controlling fluid flow between said inlet and outlet ports, and means on said valve body operatively coupled to said first slide for controlling position of said spool means within said valve body as a function of movement of said first slide, said means on said valve body operatively coupled to said first slide comprising means operatively coupled to said first and second slides for controlling position of said spool means within said valve body, and thereby controlling flow of fluid to said actuator, as a function of a difference in movement between said first and second slides, said means operatively coupled to said first and second slides comprising a sprocket rotatably mounted on said valve, a chain trained around said sprocket and having opposed ends coupled to said first and second slides, and means on said valve operatively coupling said sprocket to said spool means, said means on said valve operatively coupling said sprocket to said spool means comprising an anvil pivotally mounted on said valve body, said sprocket being rotatably mounted on said anvil, and a valve pin slidably mounted in said valve body and engaged at opposed ends with said anvil and said spool means.

* * * * *